United States Patent Office 3,297,605
Patented Jan. 10, 1967

3,297,605
WATER DISPERSIBLE CONDENSATION PRODUCTS OF A DRYING OIL GLYCERIDE ESTER AND A POLYETHYLENE GLYCOL
Herbert M. Schroeder, Williamsville, and Joseph A. Pawlak, Buffalo, N.Y., assignors, by mesne assignments, to Textron Inc., a corporation of Rhode Island
No Drawing. Filed Jan. 10, 1961, Ser. No. 81,700
16 Claims. (Cl. 260—22)

The paint industry has long desired a paint or like protective coating that on the one hand would have the properties of a drying oil paint such as a linseed oil paint, and, on the other hand, would be water-soluble. The desirability of having a single paint of this type, with the combined advantages of both a drying oil paint and a water-soluble paint, cannot be questioned, but as oil and water "do not mix," this concept on its face was deemed for the most part to be impractical in the paint field. The art nevertheless has been actively engaged in attempts to solve this problem as illustrated by Arndt Patent 2,634,245, directed to water-dispersible alkyd type resins which form emulsions when dispersed in water. The Arndt process calls for the reaction of 70 to 90% by weight of an oil modified alkyd resin with 10 to 30% by weight of polyethylene glycol. Arndt's alkyd resin used in this process and made, for example, by reacting phthalic anhydride and glycerol with the modifying oil, e.g. a mixture of soybean and tung oils or linseed oil, contains only 30 to 60% by weight of oil. The resulting resin, 30 to 60% oil modified, is a solid or semi-solid product with a viscosity as specified by Arndt of W to Z or above when diluted in 50% by weight of naphtha, or $Z_3$ at a concentration of 50% by weight in petroleum naphtha boiling at 310 to 410° F. as specifically illustrated in Arndt's Example I. This type of resinous product, 30 to 60% by weight oil modified, when reacted with polyethylene glycol, yields a reaction product which does not have the inherent advantages found in a drying oil paint and also lacks the desired properties found in a good water-soluble paint.

In the British publication, JOCCA 40, 849–862, (October 1957), Armitage, F. and Trace, L. G., point up on page 852 some of the shortcomings (perhaps the main weakness) of the Arndt process, as the difficulty of getting a product with good stability, i.e. good emulsion stability, and good film characteristics at the same time. Both of these properties, good stability along with good film forming characteristics, are essential requirements of a satisfactory paint.

In an attempt to avoid the weakness of or primary problems encountered with the Arndt product made by reacting an oil-modified alkyd resin with polyethylene glycol, Armitage and Trace proposed a modification in which the polyethylene glycol (PEG) is built-in the alkyd resin by reacting the polyethylene glycol in admixture with the individual ingredients used to prepare the oil-modified alkyd resin (e.g. phthalic acid, pentaerythritol, linseed acids) instead of reacting the polyethylene glycol with the previously formed oil-modified alkyd resin as called for in the Arndt process.

Armitage and Trace maintained the percentage of polyethylene glycol at 10% based on the final alkyd and, like Arndt, used short oil length alkyds, 50 to 56% oil modified. The reasons for the use of 10% polyethylene glycol and short oil length alkyds by Armitage and Trace with their PEG built-in product, are that they found (a) increasing the amount of polyethylene glycol resulted in air dry films which develop a definite aftertack and (b) increasing the oil length resulted in a decrease in dispersibility of the product. In their work Armitage and Trace reported (Table II, page 853 in the JOCCA, supra) that with polyethylene glycols 200 and 300, the emulsions were stable; that with polyethylene glycol 400, the emulsion was only fairly stable; that with polyethylene glycol 600, the emulsion was unstable; and that with polyethylene glycols 1000 and 1500, the emulsions were not only very unstable but the products to be emulsified were difficult or very difficult to emulsify. The Armitage and Trace investigations indicated that the use of polyethylene glycol with a molecular weight of 1500 would likely result in better film properties than those obtainable with the low molecular weight polyethylene glycols 200 and 300, and to evaluate this prepared a gloss paint containing 35% resin solids made up of polyethylene glycol 1500 and an alkyd resin, 50% oil modified, along with 10% butoxyethanol to aid in stabilizing the emulsion. The resulting paint (as reported by Armitage and Trace in Table IV, page 857, JOCCA, supra) proved to have poor flow with poor leveling after brush application. Armitage and Trace conclude from this that their work leaves a considerable programme if certain defects in the Armitage-Trace paint, which are not easily corrected, are to be overcome.

In our investigations, in an attempt to obtain or retain the desired properties of a drying oil paint, we reacted polyethylene glycol with 100% drying oil and with drying oils modified with small amounts, up to about 20%, of modifying agents. The oil and oil-modified products, about 80% and above oil-modified, employed were liquids with relatively low viscosities compared to the high viscosity alkyd resin, 30 to 60% oil-modified, products of Arndt. We found, contrary to the teachings of Armitage and Trace, that the long oil reaction products, including products made with polyethylene glycol of about 400 molecular weight and above, were easily dispersible in limited amounts of water to form solutions and these reaction products are readily made into stable solutions in greater amounts of water by addition of small amounts of a coupling solvent such as ethylene glycol monobutyl ether. Unlike Armitage and Trace, we found that paints made from solutions of this type, including paints containing reaction products of the high molecular weight polyethylene glycols, e.g. PEG 1500, and the liquid oil or oil-modified products, were characterized by good flow and good leveling after brush application. Also, unlike Armitage and Trace, who reported with their PEG built-in product, that polyethylene glycols 200 and 300 gave easy to emulsify products forming stable emulsions yielding tack-free films, we found that the use of low molecular weight polyethylene glycols below about 400 with the liquid oil or long oil, about 80% or above oil-modified, products herein described, gave products yielding definitely inferior, slow drying films, lacking in toughness and durability.

The long oil compositions of the present invention provide paints having the desired advantages of air drying oil paints in that they form thin films which are converted by oxidation to hard, dry films having resistance to water, ultraviolet light and other film degrading factors. The long oil compositions of the present invention also provide paints having the desired advantage of water-soluble paints including low odor, non-flammable and diminished toxicity, as well as water clean-up of brushes, tools used in painting, etc.

The compositions of the present invention, unlike emulsion paints which lack mechanical stability and thus require special and involved pigmenting procedures, provide stable paint vehicles which can be pigmented in the conventional manner of grinding pigments in the paint vehicles. This applies to alkaline pigments including zinc oxide which due to its fungistatic or mildewcidal properties is highly desired in paint and which ordinarily cannot be used in emulsion paints due to sensitivity of emulsions to such materials.

Unlike emulsion paints where the physical nature of the emulsion imposes limitations upon the total solids, the compositions of the present invention also permit the formulation of paints characterized by high percentages of total solids, thus minimizing the number of coats of paint which must be applied to obtain good coverage and hiding as well as durability on weathering. In addition to fewer coats to do the required painting job, the paint compositions of the present invention, unlike emulsion paints, have been found to wet, penetrate and firmly adhere to substrates such as the chalky surfaces of weathered previously painted surfaces.

As stated, our water-dispersible paint vehicle is made through reaction of a long oil drying oil component and a polyethylene glycol. The drying oil component contains at least about 80, preferably at least about 85 or even upwards of about 90, weight percent of a drying or unsaturated fatty acid in esterified form. The presence of at least about 80 percent of the ester provides a vehicle of excellent characteristics for use on exterior surfaces and insures maximum compatibility with zinc oxide. Thus the drying oil ester may be used as such or it may be reacted with up to about 10 or even up to about 15 or 20 weight percent of a modifying constituent prior to making the water-dispersible vehicle of this invention through reaction with the polyethylene glycol. These percentages are based on the mixture of drying oil and modifying constituents. The modifying material contains a polyfunctional group or configuration, that is it can combine, e.g. through olefin-bond polymerization or condensation, with two or more molecules of the drying oil ester or a modifying constituent.

The drying oil component and polyethylene glycol are generally condensed in a proportion of about 75 to 90 weight percent of drying oil component to about 10 to 25 weight percent of the polyethylene glycol based on their mixture. Preferably, the polyethylene glycol reactant is about 12 to 20 weight percent based on its mixture with the drying oil component. The amount of polyethylene glycol to be employed may vary with the nature of the desired product; in general, higher quantities of the polyethylene glycol will impart more hydrophilic character and consequent water solubility. The precise choice of quantity of polyethylene glycol may, however, vary with the characteristics of the oil or modified oil employed, such as viscosity. The choice will also vary with the desired solution viscosity as well as the drying time and other characteristics of the product. The useful polyethylene glycols generally have average molecular weights of about 400 to 2000 and advantageously the molecular weights are in the range of about 600 to 1500. The polyethylene glycols might be employed in admixture with minor amounts of polypropylene glycols. It will be understood that blends of higher and lower molecular weight polyethylene glycols to yield mixtures within the approximate foregoing molecular weight ranges are also contemplated as is illustrated in the examples.

In general, any of the above polyethylene glycols may be used with any of the drying oil components to obtain water thinnable materials having utility as paint vehicles. Specific characteristics of these latter vehicles can be varied to some degree by the proper choice of ingredients. For example, the higher molecular weight polyethylene glycols have been demonstrated to yield tough, durable films with desirable exterior exposure characteristics. The reaction products based on the lower molecular weight polyethylene glycols yield aqueous solutions of lower viscosity hence enabling the formulation of paints with high vehicle non-volatile and consequently high total paint solids.

Similarly, the specific properties of the products can be varied to a degree by the choice of the drying oil component. For example, it may be desirable to base a product on a semi-drying oil such as soybean oil to obtain slower drying characteristics where the material is to be employed to improve the adhesion of synthetic latex paints or otherwise as an adhesive agent. The products of the invention which are based on linseed oil and certain of the modified linseed oils have been shown to have durability characteristics equivalent to those of conventional linseed oil, when formulated into exterior paint vehicles.

It is preferred to include a coupling solvent in the composition in order to increase the solution range of the reaction product in water, for instance it is most advantageous to obtain a solution in water at a dilution which gives a composition having a viscosity in the approximate 1 to 3 poise range desired for surface application. Thus after the reaction product is formed it can be mixed with up to about 30 weight percent of the coupling agent, for instance about 5 or 10 to 25 weight percent, preferably about 15 to 20 weight percent, of an oil and water-soluble coupling agent. The agents are often oxygenated organic compounds such as ethers, alcohols or esters. Preferred coupling agents are ethylene glycol ethers having the formula

wherein R is a monovalent hydrocarbon radical having up to about 8 carbon atoms, preferably not more than about 5 carbon atoms, $x$ is 1 to 2 and $R_1$ is hydrogen or

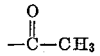

Advantageously, R is a lower alkyl radical having, for instance, 1 to 4 or more carbon atoms. Included within the oil and water-soluble coupling agents are ethylene chlorohydrin, butanol, ethylene glycolmonobutyl ether, ethylene glycol monoethyl ether, ethylene glycol monomethyl ether, ethylene glycol monophenyl ether, ethylene glycol monoisoamyl ether, the acetates of these ethers and the corresponding diethylene glycol ethers and acetates, etc. In addition to the preferred coupling agents noted above, coupling agents giving vehicles, intermediate between a typical white milky emulsion and a translucent colloid, in a viscosity range at 40 N.V. of 0.5 to 3.5 poises, and which are stable for the short period tested (at least one day) include 15 and 25% diacetone alcohol, 15 and 25% dimethyl formamide, 15 and 25% dimethyl acetamide, 15 and 25% acetonitrile, 15 and 25% tetrahydrofuran and 15 and 25% Shell's Pent - oxol (4-methyoxy-4-methyl-2-pentanol). Generally, the coupling agents boil in the range of about 100 to 200° C. This constituent, as is the case with the others described, usually does not contain additional substituent groups although such may be present if the overall effect desired is not materially reduced.

The coupling solvent is effective towards extending the amount of water in which the reaction product is soluble. The term "solution" is used to include colloidal solutions and in any event the resulting aqueous material does not show particulate matter when viewed by transmitted light. The solutions are highly stable and there is less tendency for solids such as pigments to settle upon storage than exhibited by many emulsions and paints. Should any settling occur a good dispersion can be readily re-established through agitation.

In preparing our water-dispersible vehicle the drying oil component and polyethylene glycol can be reacted at an elevated temperature, for instance, of about 150 to 250° C., preferably about 200 to 225° C., in the presence or absence of a catalyst. The pressure usually approximates atmospheric but higher or lower pressures may be employed. The reactants are mixed, for instance by extensive agitation, and advantageously the reaction mixture is blanketed with nitrogen or other gas which is inert to the reaction. The reaction may be conducted in the presence of a transesterification (alcoholysis) catalyst. Suitable transesterification catalysts include, among others, alkali metal earths, heavy metal oxides, heavy metal salts, etc. The preferred catalysts include litharge (PbO) and stannic chloride ($SnCl_4$). In general, when the reaction is performed without a catalyst longer reaction times are needed.

The reaction time is that which gives a liquid, water-dispersible product. The initial reaction mixture is not water-dispersible and if the reaction is extended too long the water-dispersible range can be passed. It is relatively easy, however, to follow the reaction by taking samples as the reaction progresses and testing the samples, for instance in a standard procedure in which the sample is mixed with a coupling solvent, to determine whether the product is water-dispersible. We have found it most advantageous to stop the reaction when the testing of the selected samples shows that the viscosity of the product in water approximates a minimum. The viscosity of the water solution of the reaction mixture decreases to a minimum as the reaction continues and then the viscosity increases. It is at or near, usually shortly after, reaching the minimum viscosity that we prefer the reaction to be stopped, as by discontinuing heating, in order that the vehicle can be brought to surface application viscosity with minimum dilution and at maximum paint solids to afford a product with better covering characteristics.

The reaction product usually has a viscosity of up to about 100 poises or somewhat greater, often the viscosity does not exceed about 40 poises and most advantageously is less than about 10 poises, for instance about 5 to 10 poises. Usually the reaction time is about 1 to 12 or more hours; however, we prefer times of about 2 to 6 hours.

The long oil drying oil component of the water-dispersible liquid reaction product of the present invention is an unsaturated aliphatic monocarboxylic acid ester, e.g., glyceride, whether natural or synthetic. The drying oil ester is of a fatty or alkenyl carboxylic acid having about 14 to 20, preferably about 18, carbon atoms, and 1 to 3 or more, usually at least 2, unsaturated carbon-to-carbon or olefinic bonds. The alcohol portion of the ester is of an alkane polyhydric alcohol of 3 to 6 hydroxyl groups and 3 to 6 carbon atoms. The preferred alkanol source of the ester radical is glycerol which affords glycerides such as those occurring in nature. The drying oil component initially can be in acid form and be subsequently reacted with the polyhydric alcohol to form the ester. Alternatively, the acid can be reacted with the polyhydric alcohol at the same time the drying oil component is being modified, for instance with a polyhydric alcohol and with or without another modifying constituent such as a polycarboxylic acid. In any event the drying oil component is essentially in the ester form when reacted with the polyethylene glycol. Heat bodied or polymerized forms of the drying oil acids and esters are also useful. Thus the drying oil component may be the drying oil ester as such or the carboxylic acid or ester can be modified through pre-reaction with up to about 20 weight percent, preferably about 5 to 15 weight percent, of one or more polyfunctional compounds such as polyolefins, polycarboxylic acids and polyhydric alcohols. These acids and alcohols can also have olefinic unsaturation. The modification preferably involves a polyolefin or both of a dicarboxylic acid and polyhydric alcohol. For instance, the modifying polycarboxylic acid and polyhydric alcohol will usually be employed in approximately esterification stoichiometric proportions although either may be in excess. We prefer an excess of alcohol. Generally about 25 to 75 weight percent of each of the polycarboxylic acid and polyhydric alcohol based on their mixture is used in modifying the drying oil ester with such materials. The various drying oil components can be further substituted with non-interfering substituents although they are most often employed in unsubstituted form. Regardless of its constituency the drying oil component, whether an ester itself or a modified ester, is essentially liquid at ambient temperatures, and in general has a viscosity in the ranges set forth above with respect to the polyethylene glycol reaction product.

The drying, including semi-drying, oils which can be used in the preparation of the water-dispersible vehicles include the synthetic polyhydric alcohol esters of non-conjugated and conjugated unsaturated fatty acids as well as non-conjugated and conjugated natural drying oils of animal and vegetable origin, all having an iodine value not less than about 110. For example, soybean oil, linseed oil, safflower oil, tung oil, perilla oil, China-wood oil, oiticica oil, walnut oil, poppyseed oil, etc., are among the natural drying and semi-drying oils which may be used while the unsaturated acids include oleic, ricinoleic, linoleic, etc. Where tung oil or other natural conjugated oils are employed it is preferred to first heat the oils to an elevated temperature of 280° C. or thereabouts to "gas-proof" or enable them to form non-wrinkling films, just as would be the case in their use in conventional organic solvent system paints or varnishes. Thus, the conjugated oils may be considered a special case of the modified oils which are operable. Similarly, glycerol and other higher polyhydric alcohol esters of the mixed fatty acids which characterize the natural drying and semi-drying oils may be employed. Included would also be the polyhydric alcohol esters of tall oil and of tall oil fatty acids.

When modified drying oils are used, the pre-reaction of the drying oil acid or ester component can be with a polycarboxylic acid, polyhydric alcohol or their mixture. These materials encompass aliphatic, including cycloaliphatic, and aromatic dicarboxylic acids of, for instance, 2 to 12, preferably 4 to 8, carbon atoms. Representative acids are: the alpha, beta ethylenically unsaturated polycarboxylic acids, maleic, fumaric, aconitic, etc.; the saturated aliphatic polycarboxylic acids, succinic, glutaric, sebacic, azelaic, tartaric, etc.; and the aromatic polycarboxylic acids such as the phthalic acids. Also the acid anhydrides, esters, partial esters and other forms can be employed.

The polyhydric alcohols employed in the modified drying oils are aliphatic, including cycloaliphatic, in character, and are the same as those forming the ester portion of the drying oil component. The materials are alkane polyhydric alcohols generally of 3 to 6 carbon atoms and containing 3 to 6 hydroxyl groups to a molecule. Among the useful polyhydric alcohols are glycerol, mannitol, sorbitol, pentaerythritol, trimethylol propane, trimethylol ethane, 1,3,6-hexanetriol, etc. and these can be mixed with other materials, for instance ethylene glycol, diethylene glycol, dipentaerythritol, etc.

As stated the drying oil component may be modified through reaction with a polyolefinic material. The olefins can be aliphatic, including cycloaliphatic, that is alkenyl, hydrocarbons. Usually the olefinic material has about 4 to 8 carbon atoms, and among the useful materials are cyclopentadiene, cyclohexadiene, 1,4-butadiene, isoprene, etc.; however, polymers of these olefins containing about 2 to 10 units of monomer may also be employed.

Among the chemically modified oils which may comprise the hydrophobic oil or oleoresinous portion of the reactants may be listed (1) the so-called synthetic polyhydric alcohol esters already described, which are prepared by heating fatty acids with higher polyhydric alcohols such as glycerol, pentaerythritol, sorbitol and the like by means well-known to the art; (2) the heat polymerized natural drying and semi-drying oils and synthetic esters described previously, said heat bodying likewise being old and well-known to the art; (3) maleic modified drying oils and semi-drying oils, made for instance as described in Schwarcman U.S. Patent 2,412,177 and the maleic modified drying oils and fatty acids made by the different processes described by Ellis U.S. Patent 2,033,-131 and Clocker 2,188,882; and (4) hydrocarbon copolymers of drying and semi-drying oils, including vinyl copolymers made as described in Schwarcman U.S. Patent 2,912,396 and others and diene copolymers made as described in Gearhart U.S. 2,361,018. Dehydrated castor oil is also a suitable and desirable component, and may be considered a conjugated drying oil obtained by the chemical modification or dehydration of castor oil.

Although we strongly prefer the maleic acid (including the anhydride)-pentaerythritol modified oils, another class which may be employed in this invention is defined as the long oil modified phthalic anhydride, or isophthalic acid modified oils in which the oil content is about 80% or greater, and which oils are capable of being made at 100% non-volatile at viscosities of not significantly greater than about 100 poises. Specifically, such modified long oils can be made as liquid materials without the use of naphtha or other petroleum or organic solvents. This fact is of great consequence to obtaining the unique liquid products of this invention, which are capable of thinning with water to obtain dispersions and solutions having very useful properties as paint vehicles and for other purposes.

The long drying oil component can be modified by the described or other constituents under the usual conditions, e.g. temperatures of about 200 to 300° C. and pressures at or near atmospheric. Generally the reaction is continued to insure a liquid product, for instance, prolonged heating may cause undesirable gelation, and most often the acid number of the liquid product is below about 20.

Although the drying oil component-polyethylene glycol liquid condensate can be dispersed in organic vehicles such as the usual paint thinners, the reaction product is water-dispersible and can be used most advantageously in aqueous based coating compositions containing other ingredients if desired such as solid pigments, fungicides, mildewcides, etc., particularly zinc oxide which can be added to the reaction product, for instance in amounts up to about 100 weight percent, most often greater than about 10 weight percent based on the reaction product. The aqueous based coating composition can have varying amounts of water with the amount usually being selected by the coating applicator according to the characteristics desired in the composition both during application and after drying. In many instances, the water will be sufficient to give a product of about 1 to 3 poises viscosity for application to surfaces. The coating composition can also contain solid pigments and other ingredients. The various agents such as the pigment and fungicide are preferably added to the drying oil component-polyethylene glycol reaction product prior to dilution for application as a coating.

The drying oil component-polyethylene glycol liquid reaction product may be employed in other ways, for instance in making pigment concentrates. In this use the concentrate is often a relatively thick mixture and may even be in a paste or essentially solid form. These concentrates usually contain little if any water although the concentrate is water-dispersible. The various water-insoluble, organic and inorganic paint pigments can be employed such as titanium dioxide, zinc oxide, phthalocyanine blue, lead chromate yellows, molybdate orange, iron oxide red, and other organic and inorganic pigments as well as extender pigments such as talc, clay, mica, etc. Other uses for the water-dispersible reaction product are contemplated, for instance it may be mixed with water and employed as an insecticide vehicle, serving to hold the active insecticide ingredient on a plant or other surface upon which the composition is applied as by spraying.

The following examples are illustrative of the principles of this invention. The reactions were conducted in carbon dioxide as an inert gas.

Example 1

2425 g. of 30 poises viscosity heat polymerized linseed oil, 503 g. of polyethylene glycol of 1000 molecular weight (PEG 1000) and 0.75 g. of PbO were heated together for 4 hours at 220° C. The resultant product had a viscosity of 100 poises and was successively thinned with 5, 10 and 20% ethylene glycol monobutyl ether and upon further dilution with water yielded a colloidal type dispersion. With 5% of the ether, surface application viscosity of about 1 poise was achieved at 38% non-volatile (NV); with 10% of the ether, the same viscosity was attained at about 33% NV, and with 20% of the ether at about 27% NV. NV as referred to means 100% minus the percent of water and coupling agent.

Example 2

2634 g. of 36 poises of heat polymerized soybean oil, 366 grams of PEG 1000 and 0.11 g. of $SnCl_4 \cdot 5H_2O$ were heated in a vessel for 5 hours at 200° C. 15 parts of ethylene glycol monobutyl ether and 10 parts of water were added to 75 parts of above alcoholysis product. The analysis of resultant product was: viscosity, 23 poises; nonvolatile (NV), 75.0%; acid value (AV), 3.6; Gardner color, 8.5. When this vehicle was diluted with water a slight increase in viscosity was initially observed; subsequently the viscosity decreased, reaching about 1.0 poise at 45% NV.

Example 3

1440 grams of a linseed oil which had been reacted at 250° C. for 1–2 hours with 3.9% pentaerythritol and subsequently at 250° C. with 4.9% maleic anhydride to yield a modified oil having a viscosity of 7 poises was heated to 220° C. with 200 grams of PEG 1000 and 2 g. of PbO. The reaction mass was held at this temperature for 4 hours to give a product having a viscosity of 5.2 poises.

To 300 g. of this reaction mixture was added 60 g. of ethylene glycol monobutyl ether. A clear vehicle having a viscosity of 2.6 poises resulted. Upon the addition of water, the viscosity increased till about 60% NV and a translucent vehicle was achieved. As the vehicle was further diluted with water, the vehicle remained translucent and became less viscous achieving about 1 poise viscosity at 45% NV.

Metallic driers could be added before or after aqueous dilution, but more reproducible results were obtained when the driers were added before aqueous dilution. When 0.6% Pb, 0.03% Mn and 0.03% Co on the basis of vehicle solids were added as water-dispersible driers a 1.5 mil film (dry film) was found to dry in 4–10 hours.

Example 4

1500 grams of soybean oil (modified with 3.7% of pentaerythritol, 4.7% maleic anhydride and polymerized at 293° C. to 35 poise viscosity), 314 g. of PEG 1000 and 0.9 g. $SnCl_4 \cdot 5H_2O$ were heated together at 220° C. for 1 hour. The reaction mixture was cooled and diluted with 20% ethylene glycol monobutyl ether to obtain a clear solution of 3.2 poises viscosity. Upon further dilution with water a clear solution having a 1.0 poise viscosity at 35% NV was obtained.

Example 5

85% of alkali refined linseed oil was copolymerized with 15% of dicyclopentadiene at a temperature of 285° C. in an autoclave. Copolymerization continued until the copolymer had a viscosity of 46 poises. 480 parts of this copolymer, 100 parts of PEG 1000 and 0.05 part of LiOH were heated to 220° C. and held at this temperature for 2 hours. To the cooled reaction product was added 10% ethylene glycol monobutyl ether and 0.12% Co as metal in the form of water-dispersible drier. The clear resultant vehicle was water-reducible, yielding upon water addition a translucent colloidal solution type vehicle with a viscosity of 42 poises at 60% NV, of 16 poises at 55% NV and 2.7 poises at 50% NV. An applied film set in 3 hours and was dry with slight tack at 8–16 hours. The speed of drying was readily accelerated by application of heat; a dry, slightly yellow film was obtained after 15 minutes at 175° C.

*Example 6*

720 grams of an 85% modified linseed oil was prepared by reaction with 4% pentaerythritol at 240° C. and 9% isophthalic acid (viscosity 5–6 poises and AV 16) at 250° C. The modified oil having a viscosity of 13 poises and an AV of 6.1 was heated to 220° C. in the presence of 150 grams of PEG 1000 and 0.3 g. PbO. After heating for 3 hours at 220° C. the product was cooled and diluted with ethylene glycol monobutyl ether to 83% NV. A clear vehicle of 3.5 poises viscosity resulted. The vehicle may be further reduced with water to yield a translucent vehicle of one poise viscosity at about 20% NV.

*Example 7*

To 720 g. of a modified linseed oil base prepared as in Example 3 were added 4.8 grams of PEG 9000, 95.2 g. PEG 600 and 0.15 g. PbO. This mixture was heated for 4 hours at 220° C. to give a product having a viscosity of 7.2 poises which was reduced to 75% NV with ethylene glycol monobutyl ether. A hazy vehicle of 1.5 poises viscosity resulted. Upon addition of water a milky to translucent vehicle having a viscosity of 1 poise was obtained at 40% NV.

*Example 8*

828 grams of a modified linseed oil prepared as in Example 3 was heated to 220° C. with 172 g. of PEG 1500 and 0.26 g. PbO. After holding at this temperature for 3 hours, the product was cooled and diluted with ethylene glycol monobutyl ether to 83% NV. A clear vehicle resulted which had a viscosity of 1.6 poises. Upon addition of water the vehicle increased in viscosity to about 50% NV and then decreased in viscosity till a milky translucent vehicle of 1 poise viscosity was achieved at 35% NV.

*Example 9*

1655 g. of a modified linseed oil prepared as in Example 3, 345 g. PEG 600 and 1.0 g. of PbO were heated together for 2 hours at 220° C. The cooled reaction product was reduced with 25% ethylene glycol monobutyl ether yielding a clear vehicle of 0.9 poise viscosity. Upon addition of water very little change in viscosity was noted until diluted below 30% NV.

The products of Examples 6, 7, 8 and 9 all formed clear lustrous films with drying times of 8–16 hours when exposed in thin films with added catalytic metal driers.

*Example 10*

2425 g. of a modified linseed oil prepared as in Example 3 was reacted with 503 g. of polyethylene glycol 1000 under the same conditions used in Example 3. The product was diluted to 80% NV with ethylene glycol monobutyl ether and used as the vehicle for an exterior white house paint formulation. The paint was prepared by mixing all the pigments with a portion of the vehicle and the water to result in a mill paste, then this paste was ground through a high-speed laboratory paint mill. Driers were incorporated into the balance of the vehicle, and this combined with the pigment paste and the balance of the water. The total formulation and constants of the resulting paint were as follows:

| Material: | Gms. |
|---|---|
| Rutile TiO$_2$ | 50.0 |
| Anatase TiO$_2$ | 125.0 |
| Zinc oxide | 250.0 |
| Talc | 324.0 |
| Vehicle (80% NV) | 488.0 |
| Water | 480.0 |
| 6% cobalt naphthenate | 3.6 |
| 6% manganese naphthenate | 1.2 |
| 24% lead naphthenate | 8.9 |
| | 1730.7 |

Constants:
  PVC—31.5%
  Viscosity—79 Krebs Units (KU)
  Vehicle NV—40.4%
  Total NV—65.9%

*Example 11*

A vehicle was prepared as in Example 10 but substituting polyethylene glycol 600 for the PEG 1000 used previously. The product (viscosity 4.5 poises) was diluted to 90% NV using ethylene glycol monobutyl ether and used as the vehicle for a white exterior house paint having the following formulation and constants:

| Material: | Gms. |
|---|---|
| Rutile TiO$_2$ | 50.0 |
| Anatase TiO$_2$ | 125.0 |
| Zinc Oxide | 250.0 |
| Talc | 324.0 |
| Vehicle (90% NV) | 434.0 |
| Ethylene Glycol Monobutyl Ether | 220.0 |
| Water | 170.0 |
| 6% cobalt naphthenate | 3.6 |
| 6% manganese naphthenate | 1.2 |
| 24% lead naphthenate | 8.9 |
| | 1586.7 |

Constants:
  PVC—31.5%
  Viscosity—75 KU
  Vehicle NV—47.5%
  Total NV—71.8%

The house paints of Examples 10 and 11 were subjected to a series of accelerated and practical tests. The paints were stable in viscosity on storage and had properties equal to or better than conventional solvent thinned linseed oil paints insofar as application, gloss, leveling and drying characteristics were concerned. The test paints showed excellent weatherometer performance, the films being chalked but otherwise intact after 1000 hours exposure. In addition the test paints had excellent adhesion to chalky surfaces, showed good hiding and coverage in one coat. It was further noted that brushes used in the test paints could be cleaned in water or soapy water after being used for applying the paints over the course of an eight-hour period.

*Example 12*

85 parts of the vehicle comprising the 75% NV product of Example 2 was ground on a roller mill with 15 parts of Monastral Red pigment, yielding a red pigment paste having a viscosity of 130 KU.

Similarly, 85 parts of the same vehicle was ground with parts of phthalocyanine green yielding a pigment paste having a viscosity of about 140 KU.

One-half ounce portions of each of these colored pigment pastes were added to separate one quart samples of various white base paints as follows: (1) styrene-butadiene interior emulsion paint, (2) polyvinylacetate interior emulsion paint, (3) acrylic exterior emulsion paint, (4) oil-modified alkyd interior flat paint, (5) oil-modified alkyd interior semi-gloss paint, (6) linseed oil exterior house paint, and (7) a linseed oil based stain and blister resistant paint. There were no significant differences between the various tints made with each colorant paste, in spite of the diverse types of white base paints employed, as measured by reflectance before and after tinting. In no case was there any substantial effect on viscosity of the tinted paints, nor did any of the applied paint films show any evidence of flooding or flocculation.

*Example 13*

115 grams of burnt umber pigment was ground with 175 g. of the clear vehicle of Example 3. 4 parts of this pigment concentrate was dispersed in a number of different types of commercial white paints. These included a polyvinylacetate interior flat wall paint emulsion, a high gloss alkyd enamel, a butadiene-styrene latex paint, an alkyd flat wall paint and an acrylic emulsion paint. When the films of the shaded paints were applied excellent color development was noted and the colorant was well dispersed as indicated by rubbing tests.

What is claimed is:

1. A liquid, water-dispersible composition of matter having a viscosity of up to about 100 poises which is a condensate of a mixture consisting essentially of about 75 to 90% of a drying oil glyceride ester, said ester being of an acid consisting essentially of an olefinically unsaturated fatty acid of 18 carbon atoms, said glyceride ester being selected from the group consisting of (A) heat-polymerized glyceride esters and (B) glyceride esters modified with about 5 to 20% of a member selected from the group consisting of (1) a polyhydric alkanol of 3 to 6 carbon atoms and having 3 to 6 hydroxyl groups and a dicarboxylic acid of 4 to 8 carbon atoms, said polyhydric alkanol and dicarboxylic acid each being present in an amount of about 25 to 75% based on their combination and (2) diolefins of 4 to 8 carbon atoms; and about 10 to 25% of a polyethylene glycol having a molecular weight of about 400 to 2000.

2. The composition of claim 1 in which the drying oil ester is linseed oil.

3. The composition of claim 1 in which the drying oil ester is a heat-polymerized glyceride ester.

4. The composition of claim 3 in which the drying oil ester is heat-polymerized soybean oil.

5. The composition of claim 1 in which the drying oil ester is modified with about 5 to 20% of a diolefin of 4 to 8 carbon atoms.

6. The composition of claim 1 in which the drying oil ester is modified with about 5 to 20 percent of dicyclopentadiene.

7. The composition of claim 1 which contains about 10 to 100 percent zinc oxide based on said condensate.

8. The composition of claim 1 in which the dicarboxylic acid is maleic acid and the modifying polyhydric alcohol is pentaerythritol.

9. The composition of claim 8 in which the drying oil ester is linseed oil.

10. The combination of claim 8 in which the drying oil ester is soybean oil.

11. The composition of claim 1 which contains about 5 to 25 percent of a coupling agent boiling in the range of about 100 to 200° C. and having the formula $$RO(CH_2CH_2O)_xH$$

wherein R is a lower alkyl radical of up to about 5 carbon atoms and $x$ is 1 to 2.

12. The composition of claim 1 in which the amount of polyethylene glycol is about 12 to 20 percent and the polyethylene glycol has a molecular weight of about 600 to 1500.

13. A liquid, water-dispersible composition of matter having a viscosity of up to about 10 poises which is a condensate of a mixture consisting essentially of about 75 to 90 percent of a drying oil glyceride ester, said ester being of an acid consisting essentially of an olefinically unsaturated fatty acid of 18 carbon atoms, and about 10 to 25 percent of a polyethylene glycol having a molecular weight of about 600 to 1500, said drying oil ester being modified with about 5 to 15 percent of maleic acid and pentaerythritol in approximately stoichiometric proportions.

14. The composition of claim 13 which contains about 10 to 100 percent zinc oxide based on said condensate.

15. The composition of claim 13 which contains about 5 to 25 percent of a coupling agent boiling in the range of about 100 to 200° C. and having the formula $$RO(CH_2CH_2O)_xH$$

wherein R is a lower alkyl radical of up to about 5 carbon atoms and $x$ is 1 to 2.

16. The composition of claim 15 in which the coupling agent is ethylene glycol monobutyl ether.

References Cited by the Examiner

UNITED STATES PATENTS

| | | | |
|---|---|---|---|
| 2,033,131 | 3/1936 | Ellis | 260—22 |
| 2,047,143 | 7/1936 | Iddings | 260—29.2 |
| 2,188,882 | 1/1940 | Clocker | 260—22 |
| 2,634,245 | 4/1953 | Arndt | 260—22 |
| 2,912,396 | 11/1959 | Schwarcman | 260—22 |
| 3,001,961 | 9/1961 | Armitage et al. | 260—22 |
| 3,077,459 | 2/1963 | Hershey et al. | 260—22 |
| 3,100,157 | 8/1963 | Schroeder et al. | 260—410.6 |

FOREIGN PATENTS 847,517  9/1960  Great Britain.

OTHER REFERENCES

"Paint, Oil and Chemical Review," 102, No. 7, 26–9 (1940).

Armitage et al.: JOCCA 40, 849–862 (October, 1957).

LEON J. BERCOVITZ, *Primary Examiner.*

ALPHONSO SULLIVAN, JAMES A. SEIDLECK,
                                      *Examiners.*

R. W. GRIFFIN, J. W. BEHRINGER,
                                *Assistant Examiners.*